United States Patent [19]
Strange

[11] Patent Number: 5,942,727
[45] Date of Patent: Aug. 24, 1999

[54] UNIVERSAL MOUNTING PLATE FOR LAMP BALLASTS

[75] Inventor: Shawn A. Strange, Allentown, Pa.

[73] Assignee: Lutron Electronics Co., Inc., Coopersburg, Pa.

[21] Appl. No.: 08/868,108

[22] Filed: Jun. 3, 1997

[51] Int. Cl.$^6$ ...................................................... H01H 9/02
[52] U.S. Cl. .............................. 174/58; 220/3.6; 248/906
[58] Field of Search ........................ 174/58, 50; 220/3.6, 220/3.8, 3.92, 3.94, 4.02, 3.9; 248/906

[56] References Cited

U.S. PATENT DOCUMENTS

| | | | |
|---|---|---|---|
| 2,297,862 | 10/1942 | Bachmann | 220/3.3 X |
| 2,520,725 | 8/1950 | Judd | 220/3.3 X |
| 2,779,812 | 1/1957 | Rowe | 174/50 |
| 3,024,937 | 3/1962 | Kooi | 220/3.92 X |
| 3,100,579 | 8/1963 | Kaufman et al. | 220/3.94 |
| 3,113,694 | 12/1963 | Sulzer | 220/3.92 X |
| 3,852,514 | 12/1974 | Lauben | 174/58 |
| 4,403,277 | 9/1983 | Eargle, Jr. et al. | 174/50 X |
| 4,576,302 | 3/1986 | Smolik | 220/3.3 X |
| 5,180,074 | 1/1993 | Bowman et al. | 220/3.3 X |
| 5,286,919 | 2/1994 | Benson et al. | 174/50 |

Primary Examiner—Dean A. Reichard

[57] ABSTRACT

A universal ballast mounting structure for fluorescent lamp fixtures has two spaced mounting plates on opposite sides of the ballast. One of the plates is adapted to be pivotally mounted to the cover of a junction box, and has an opening therethrough to enable wiring to extend from the interior of the ballast to the interior of the fixture or junction box. A snap latch or screw may be used to fix the mounting plate in a closed position. The second plate is provided with mounting ears on its opposite ends to permit the mounting of the plate to a fixture which has wiring extending from the ballast directly into the fixture. In another embodiment of the invention, the pivotal plate may be replaced by a plate with bolt ears which are offset from the ears of the second mounting plate.

18 Claims, 12 Drawing Sheets

UNIVERSAL MOUNTING PLATE FOR LAMP BALLASTS

FIELD OF THE INVENTION

This invention relates to a universal mounting configuration for a ballast for a fluorescent lamp and more particularly relates to a ballast mounting structure which can be connected to a variety of fixtures.

BACKGROUND OF THE INVENTION

It is well known that a ballast structure is needed to control the energization of a fluorescent lamp. Such ballasts may be wholly magnetic devices or may be electronic in nature to permit the driving of the fluorescent lamp at a high frequency which reduces the size of magnetic components and improves lamp efficacy.

There are a variety of lamp fixtures to which ballasts are mounted. For example, some fixtures, known as a compact fluorescent down lights have structures, depending on the manufacturer, which mount the ballast either by screw connection or removable prong and snap connection. Similarly, high hat type fixtures usually require ballast mounting by bolting extending ears of the ballast to the fixture interior. Ballasts may be mounted in a variety of locations with leads extending through various surfaces of the ballast into a junction box of the fixture.

This large variety of ballast mounting configurations has required a large number of mounting geometries for ballasts, causing large inventories and mounting difficulties in the field if the installer does not have the right mounting structure.

It would be desirable to provide a ballast for fluorescent lamps which could be universally mounted to a wide variety of lamp fixtures for initial or retrofit application.

BRIEF SUMMARY OF THE INVENTION

In accordance with the invention, a novel mounting structure is provided for a ballast in which the ballast is of parallelepiped configuration and has first and second mounting plates on its opposite major surfaces. The first mounting plate is adapted to mount to a fixture of a type requiring bolt or screw mounting to ballast mounting ears, and in which the ballast wiring, preferably but not necessarily, extends from the interior of the ballast and through a surface other than that of the first mounting plate. The second mounting plate can be pivotally mounted to a fixture junction box with a minimum of tools. The plate has stabs or projections which are received in openings supported by the junction box cover, and the mounting plate is secured at an end opposite the stab end by a snap connection latch and/or by a simple screw connection if desired. The second mounting plate preferably has openings therethrough to permit the connection of wiring from the interior of the ballast to the interior of the junction box or fixture.

As a result of the novel structure, a single ballast can be mounted to a large variety of fluorescent lamp fixtures, reducing the necessary inventory of ballasts and simplifying field installation and retrofitting of existing fixtures.

Thus, the invention uses a mounting plate for pivotal mounting and an offset flange mounting plate in a single ballast housing.

The advantages of the pivotal mounting method and offset flange arrangement of mounting the compact fluorescent ballast are:

this pivotal mounting method uses a geometry that currently exists on certain fixtures.

the mounting studs are eliminated which reduces the material and labor cost to the manufacturer.

fixture manufacturers will have a reliable way to mount the ballast in a snap-on form.

fixture manufacturers will save money by not having to supply nuts for installation and from the labor saved in snapping the ballast to the junction box.

one model number accommodates both bottom and end-leaded applications for the same lamp type.

fixture manufacturers only need to purchase one model number of ballast and can more easily keep inventory.

it allows a flexible method of mounting at the manufacturer's site if a problem arises with the original way of mounting the ballast.

The present invention makes it possible to employ these advantages in a wide variety of fixtures.

DETAILED DESCRIPTION OF EMBODIMENTS OF THE INVENTION

Figure 1:
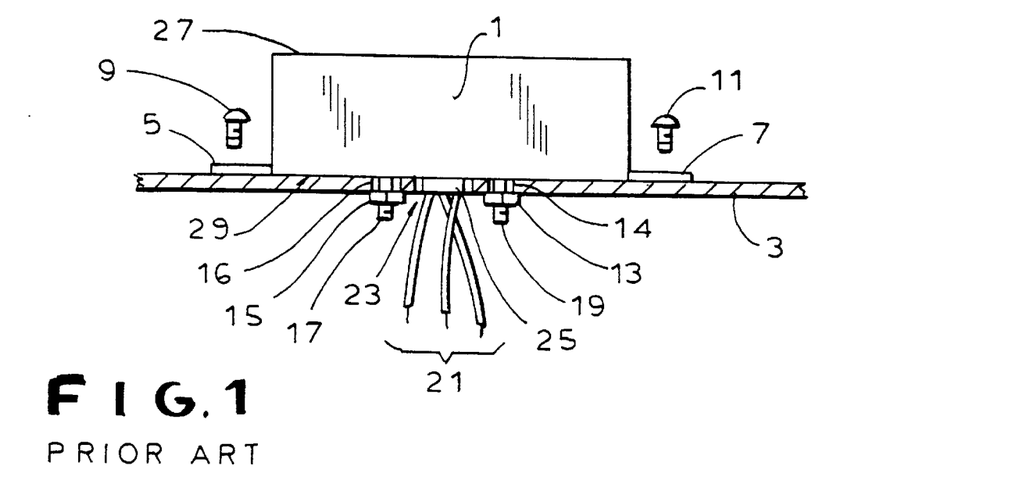
FIG. 1 shows a schematic side view of a prior art ballast and a screw-on mount therefor with leads exiting through the mounting plate.

FIG. 1 is a side view of a prior art magnetic ballast 1 of a type manufactured by Advance Transformer Co. Catalog # H1Q18-TP-BLS. This ballast can be secured to a junction box mounting plate 3 utilizing the ballast mounting ears 5 and 7 with self-tapping screws 9 and 11 or by installing nuts 13 and washers 15 tightened onto protruding threaded studs 17 and 19 respectively extending from the bottom side 29 of the ballast 1 through holes 14 and 16 respectively in the junction box mounting plate 3.

Power wires 21 which connect the ballast to the power source (not shown) and the lamps (not shown) exit the ballast 1 through a bushing 23 located on the bottom side 29 of the ballast 1 and then through a hole 25 in the junction box mounting plate 3. Self-tapping screws 9 and 11 are used to secure the ballast 1 to the junction box mounting plate 3 when the installer can access the ballast 1 from the top side 27 of the ballast 1. The nuts 13 and washers 15 are used when the installer can access the bottom side 29 of the ballast 1.

Figure 2:
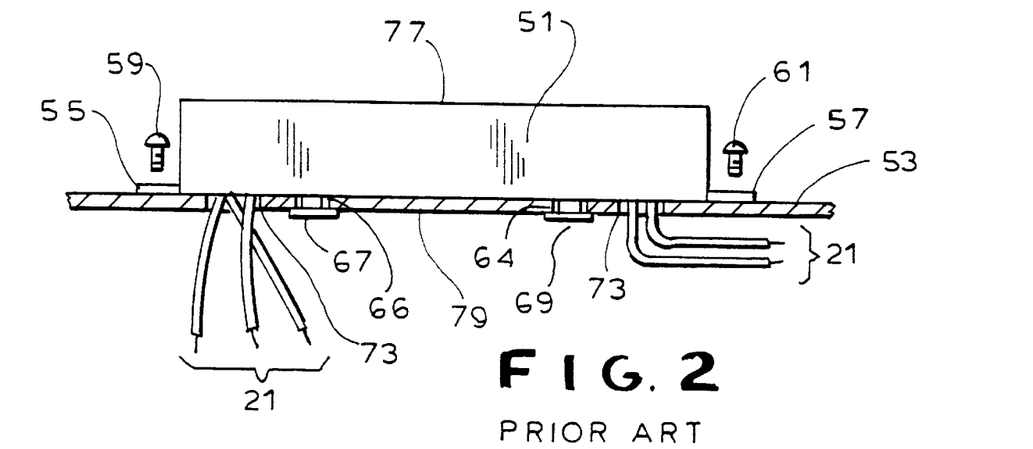
FIG. 2 shows a schematic side view of a second prior art ballast and a mount therefor similar to that of FIG. 1, but employing mounting snaps or mounting screws.

FIG. 2 shows a side view of a prior art electronic ballast of a type manufactured by Energy Savings Inc. Model # ES-2-CFQ-26-120-C. This ballast can be secured to a junction box mounting plate 53 utilizing the ballast mounting ears 55 and 57 with self-tapping screws 59, 61 or by snapping the ballast to the junction box mounting plate 53, with snaps 67 and 69 protruding from the bottom side 79 of the ballast 51. The snaps 67 and 69 must be sized appropriately for the appropriate thickness of junction box mounting plate 53. The snaps 67 and 69 extend through holes 64 and 66 respectively in the junction box mounting plate 53.

Power wires 21 exit the ballast 51 on the bottom side 79 of the ballast 51 and then through holes 73 in the junction box mounting plate 53. The self-tapping screws 59 and 61 and the snaps 67 and 69 are used for applications similar to FIG. 1.

Figure 3:
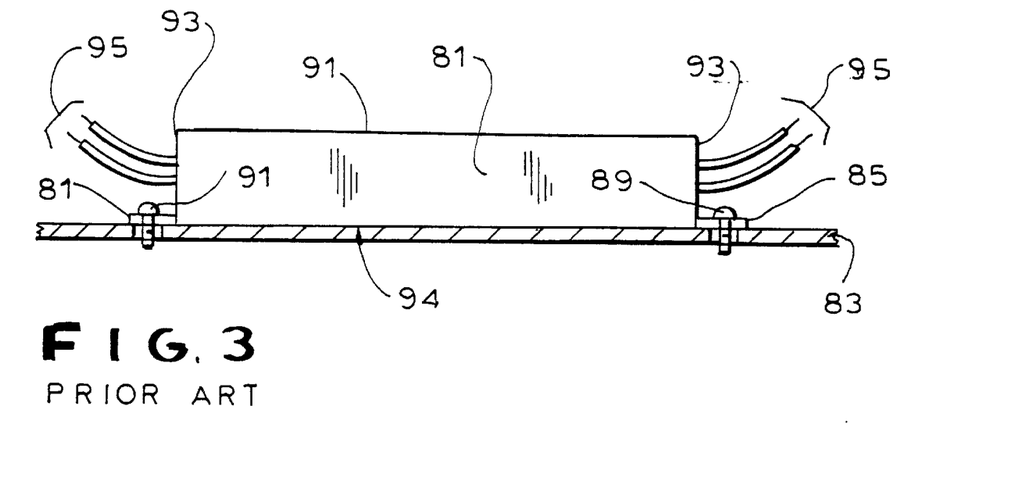
FIG. 3 shows a schematic side view of a third prior art ballast and a mount therefor, in which wires exit from the side of the ballast and extend away from the mount structure.

FIG. 3 shows a side view of a prior art electronic ballast of a type manufactured by Energy Savings Inc. model # ES-1-CFH-32-120-E. This ballast 81 can be secured to a mounting plate 83 of a fluorescent lamp light fixture, for example a "hi-hat," utilizing the ballast mounting ears 85 and 87 with self-tapping screws 89 and 91 respectively.

The power wires 95 exit the ballast 81 out the ends 93 of the ballast 81. They may also exit from the top side 91 of the ballast 81 or, in any case, away from the surface of ballast 81 in contact with mounting plate 83.

This type of mounting is used in "hi-hat" fluorescent lamp light fixtures because the installer or retrofitter does not have access to the other side 94 of the mounting plate 83.

The prior art ballasts require distinct ballast mounting configurations depending on the application. Ballasts of the same lamp type, i.e., same internal electronics, had to be made in at least two different mechanical enclosures or mounting configurations. This causes problems at the manufacturer and supplier because they have to manufacture and stock at least two different ballasts for each lamp type. This also causes problems for the retrofitter who may accidentally buy the wrong mounting configuration for his application.

Figure 6:
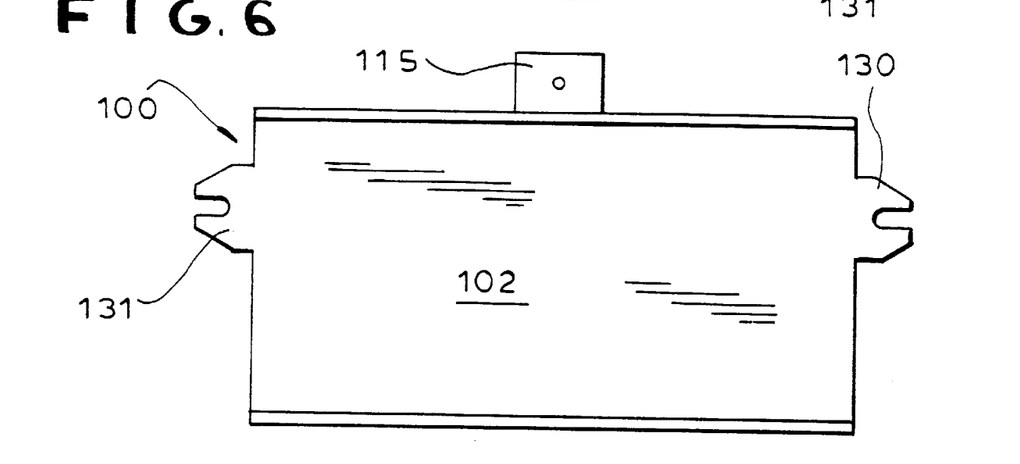
FIG. 6 is a bottom view of the novel housing of FIG. 4.
Figure 7:
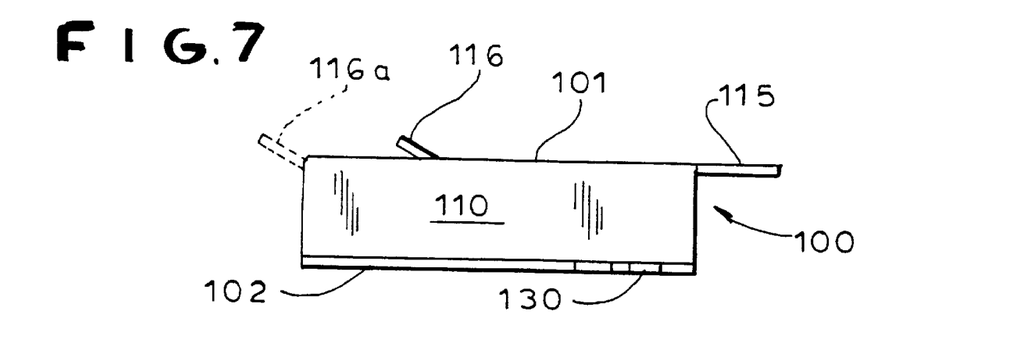
FIG. 7 is an end view of the novel housing of FIGS. 5 and 6.

FIGS. 4, 5, 6 and 7 show a ballast 100 constructed in accordance with the invention which consists of a general parallelepiped shape having opposing major parallel surfaces which carry first mounting plate portion 101 (FIGS. 4, 5 and 7) and second mounting plate portion 102 (FIGS. 6 and 7). Mounting plate portion 101 is a pivoting plate and consists of a thin metal stamping (FIG. 8) containing wire passage openings 103 and 104 which permit the passage of wires from the interior of ballast 100 to the interior of a junction box to which mounting plate 101 may be flush-mounted.

Figure 8:
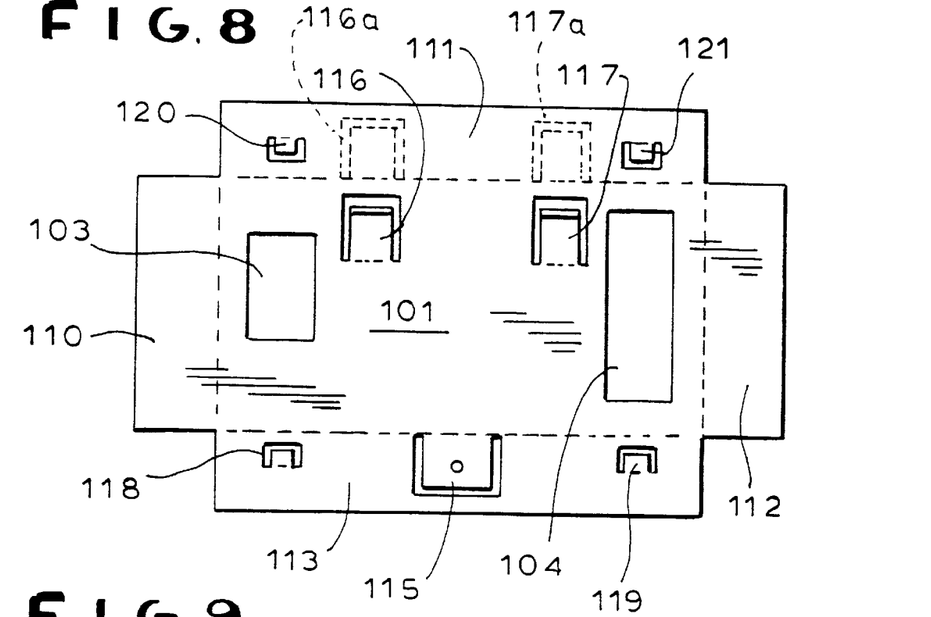
FIG. 8 is a plan view of the metal stamping which is to be folded to form a five-sided box cover for the novel structure of FIG. 4.

Mounting plate 101 is a portion of a five sided box top in which four side flaps 110, 111, 112 and 113 are bent perpendicularly to the surface of mounting plate 101 on the dotted lines shown in FIG. 8.

During stamping, the integral projection 115 is formed which acts as a latch and/or screw-down member for mounting the ballast, as will be described.

Two hinge projections or tangs 116 and 117 are also stamped and are later bent out of this plane of mounting plate 101 to serve as pivot members to be inserted in respective openings in a ballast mounting surface as will be later described. Openings 118–119 and 120–121 may also be punched in sections 113 and 111 respectively to act as tangs to be bent into holes 125, 126, 127, 128 in the bottom cover to secure the top and bottom portions, as will be later described.

Figure 4:
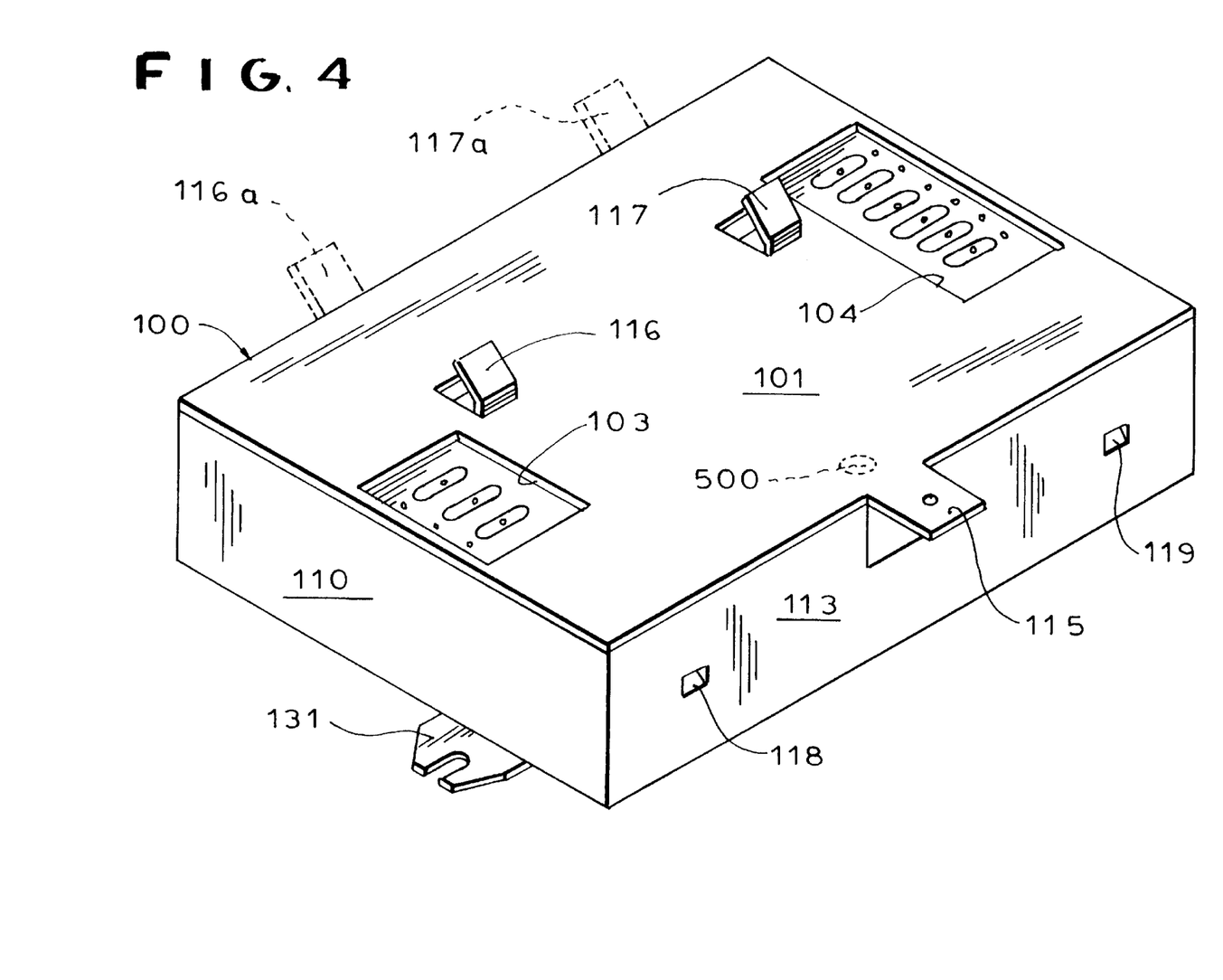
FIG. 4 is a perspective view of a ballast with the universal mounting structure of the invention.
Figure 5:
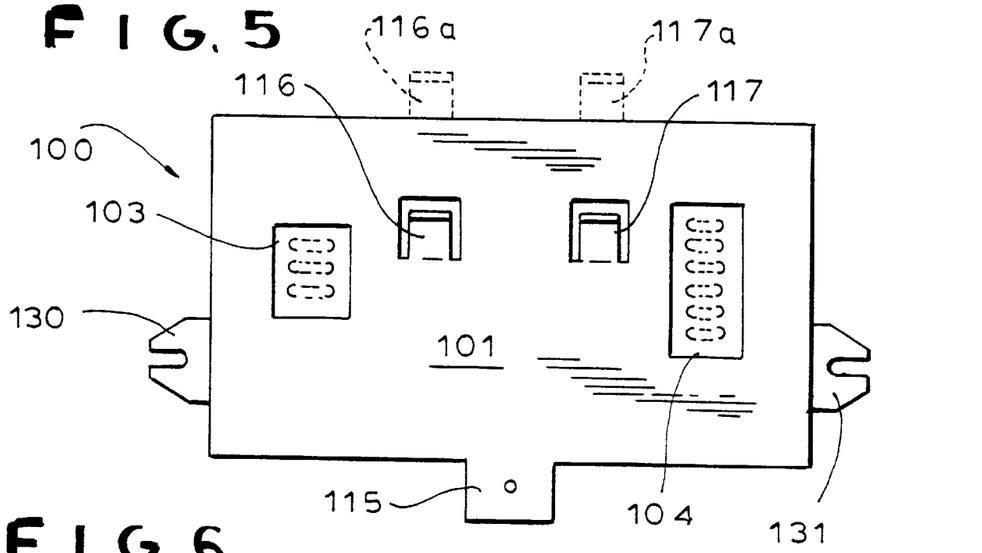
FIG. 5 is a top view of the novel housing of FIG. 4.

It will be noted that the openings 103 and 104 can expose connection sockets disposed within the interior of the ballast 100. Furthermore, hinge projections 116 and 117 may be disposed at the edge of cover 101, as shown in dotted-line positions 116a and 117a.

Figure 9:
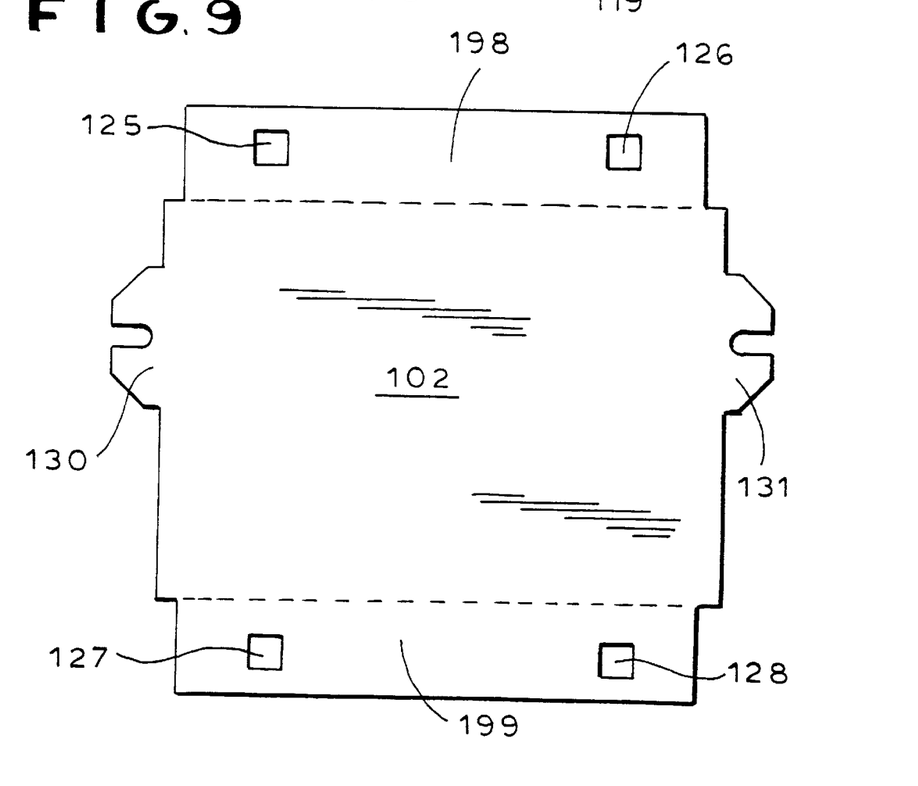
FIG. 9 is a plan view of the metal stamping which is to be folded to form the three-sided bottom and electronics receiving portion of the mounting structure of FIG. 4.
Figure 10:
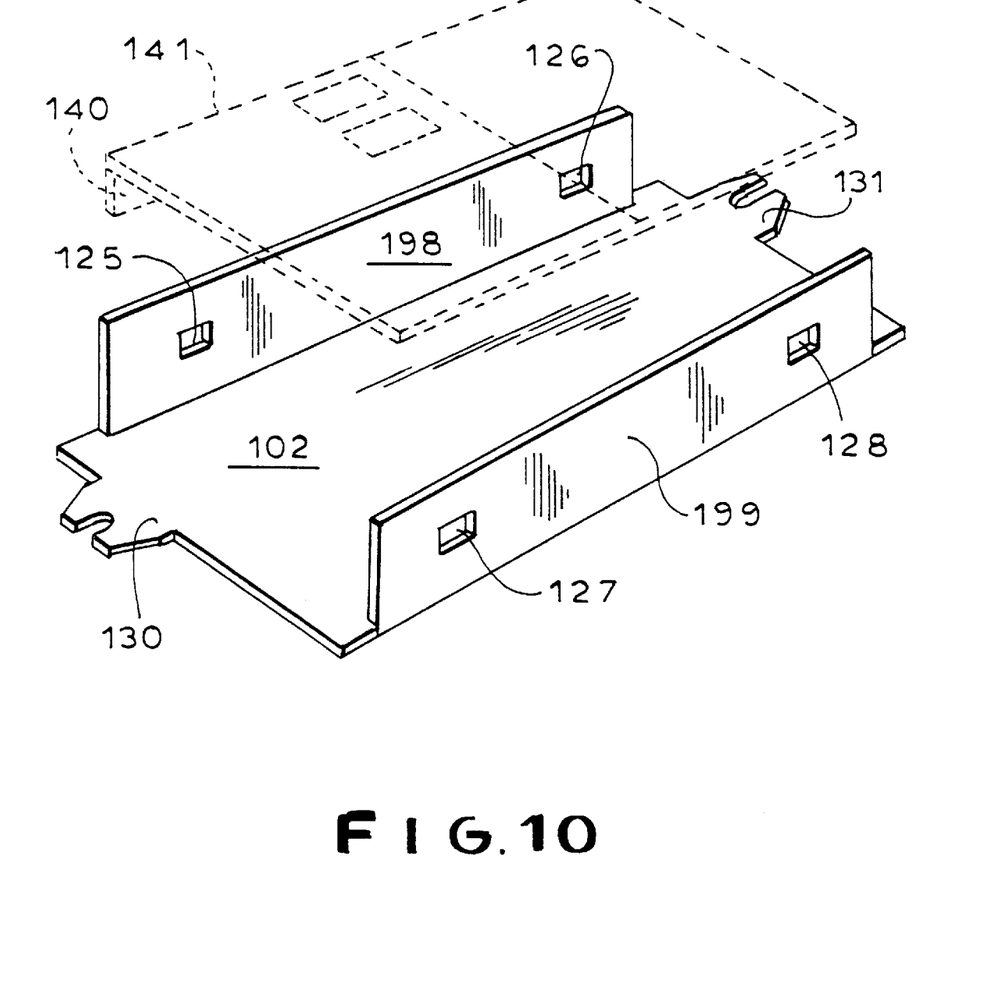
FIG. 10 shows the metal stamping of FIG. 9 when folded up to its three-sided form.

Reference is next made to the lower cover mounting plate 102. The lower cover is formed of flat sheet metal stock as shown in FIG. 9, and is a three-sided box consisting of mounting plate 102, and side flaps 198 and 199 which are bent on the dotted lines to be perpendicular to mounting plate 102. As shown in FIG. 10, side flaps 198 and 199 have holes 125, 126 and 127, 128 respectively, which receive tangs 120, 121 and 118, 119 of FIGS. 4 to 8. Significantly, mounting plate 102 has screw or bolt mounting ears 130 and 131 at its opposite sides and on a line offset from the center of area 102.

As shown in phantom in FIG. 10, a suitable ballast circuit 140 on a printed circuit board 141 is fixed to the interior of the lower cover of FIG. 10. The ballast circuit is provided with plug-in terminal structures which are exposed by openings 103 and 104 (FIG. 4) when the top cover 101 is telescoped over the bottom cover of FIG. 10.

The housing structure is now universally adapted for mounting to a variety of fluorescent lamp fixtures. Thus, the cover 101 can be used to enable pivotal mounting to a standard junction box cover in which wires must extend through the joined surfaces of the ballast and junction box. If, however, the fixture wires do not come through the junction box surface which receives the ballast surface, the ballast 100 is connected to the fixture at ears 130 and 131 and the surface 101 faces outwardly of the junction box and can receive the fixture wires.

Figure 11:
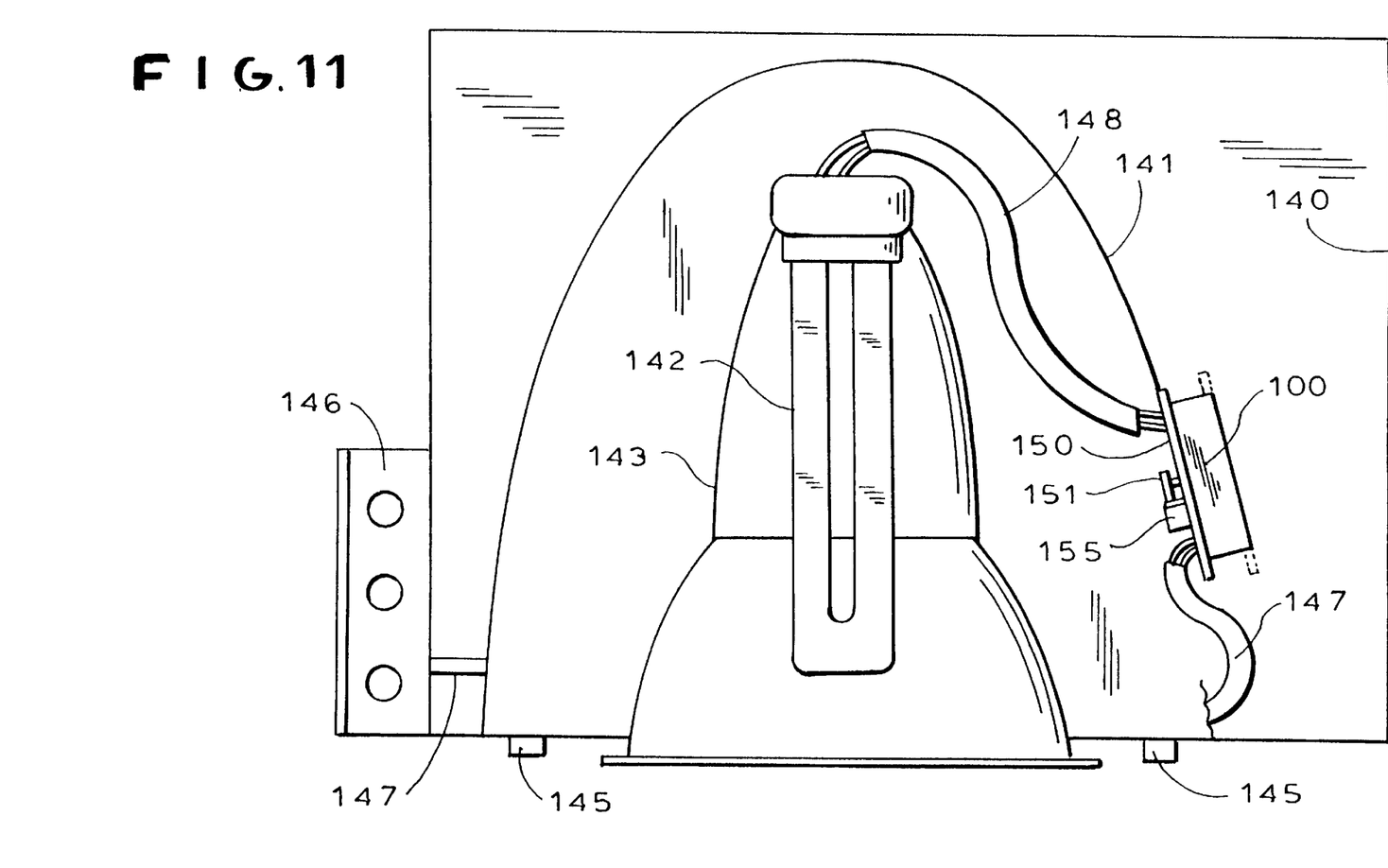
FIG. 11 is a schematic side cross-section of a compact fluorescent lamp "down-light" fixture which has a ballast such as that of FIG. 4 connected thereto.
Figure 12:
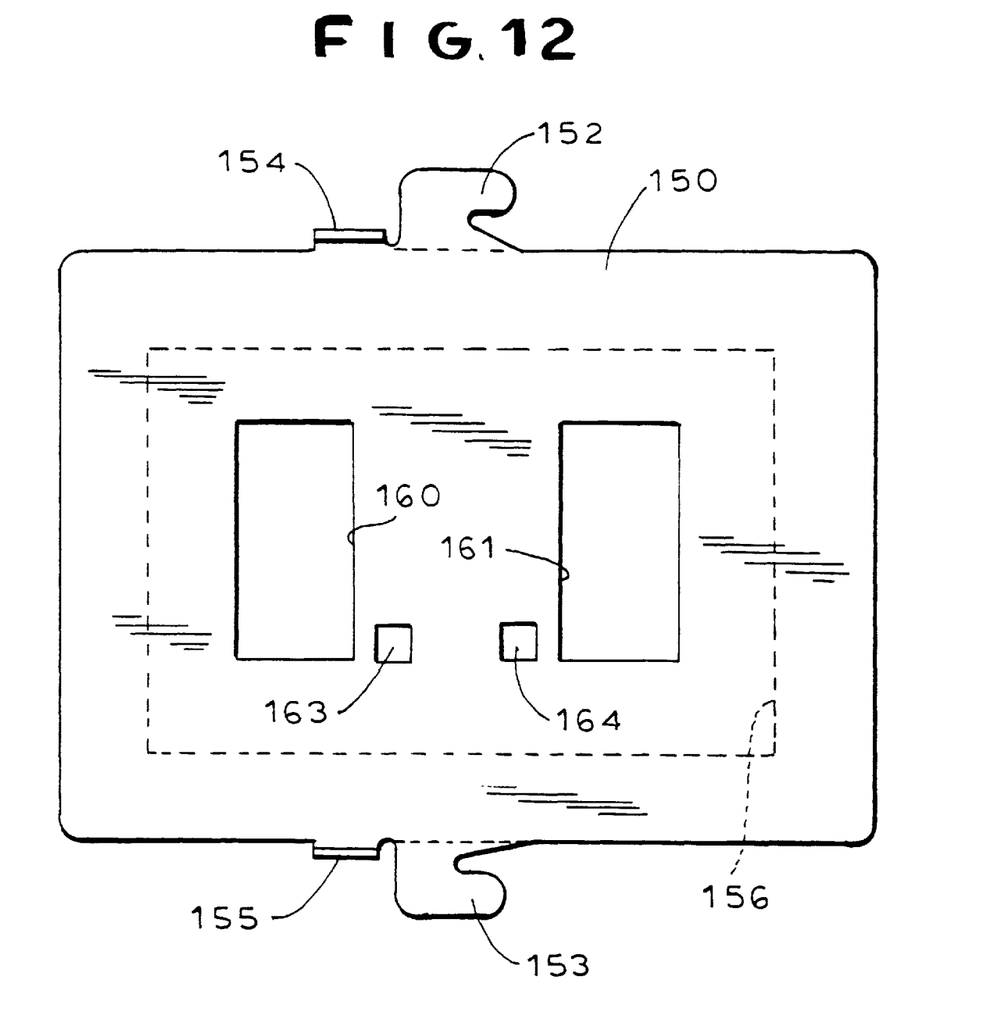
FIG. 12 is a plan view of a compartment door for the fixture of FIG. 11 which receives the fixture ballast.
Figure 13:
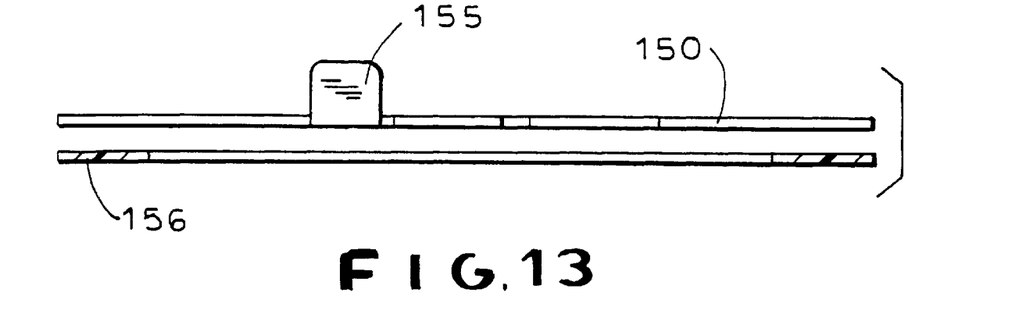
FIG. 13 is a side view of FIG. 12.

Referring next to FIG. 11, there is shown a compact fluorescent lamp "down-light" fixture which is adapted to be mounted in a ceiling. The fixture has a sheet metal inner housing 141 which supports a compact fluorescent lamp 142 and its reflector 143. A gasket 145 surrounds reflector 143 and is pressed against the top of the ceiling in which outer housing 140 is mounted. Building wiring enters junction box 146 which is fixed to housing 140 and is connected to fixture wires 147. Fixture wires 147 are connected to ballast 100, in the manner to be later described, and the wires exit the ballast 100 as wires 148, which are connected to lamp 142.

Ballast 100 of FIG. 11 is the ballast of FIG. 4. Thus, inner housing 141 is provided with a removable cover 150 which is also shown in FIGS. 12, 13, 14 and 15. Removable cover 150 covers a cooperating opening in inner housing 141 and is connected in place by screws, such as screw 151 in FIG. 11 which are received in ears 152 and 153 in FIGS. 12 and 14. Projecting tabs 154 and 155 (FIGS. 12 to 15) help position cover 150 over the opening in inner housing 141 (not shown). A gasket 156 (FIGS. 13 and 15) seals the interior areas of housing 141.

The cover plate 150 is a metal stamping provided with openings or wire passages 160 and 161 (FIG. 12) through which wires 147 and 148 can pass to be connected to the circuitry within ballast 100.

Figure 14:
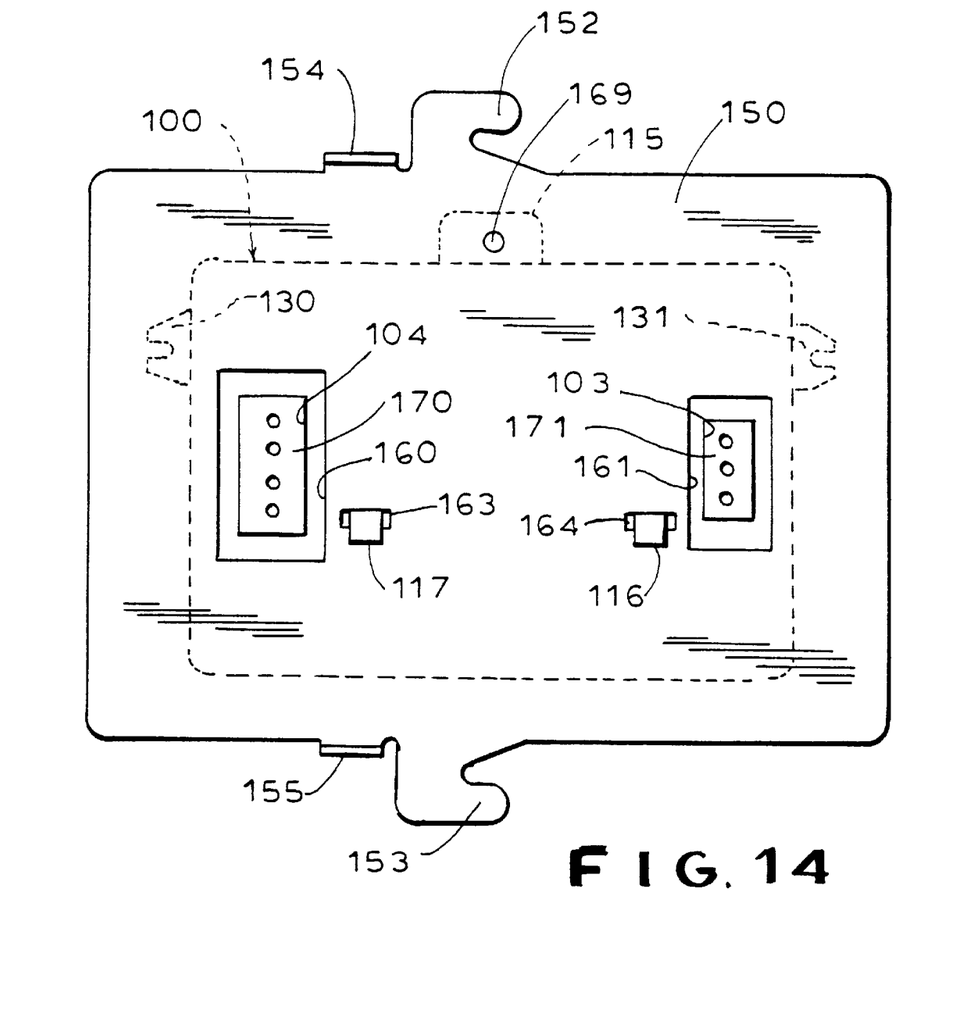
FIG. 14 shows the compartment door of FIG. 12 with the novel ballast of FIG. 4 mounted thereto by a pivotal tab connection.
Figure 15:
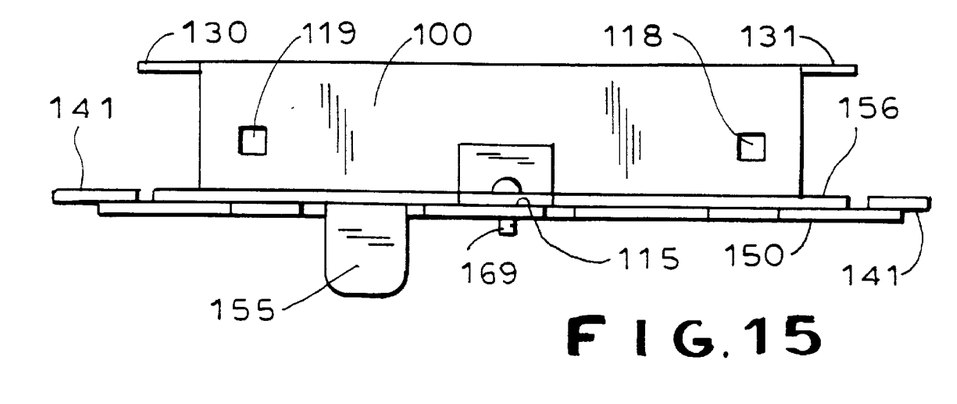
FIG. 15 is a side view of FIG. 14.

In accordance with the invention, and as shown in FIGS. 14 and 15, the cover plate 150 is provided with openings 163 and 164 which are spaced at the same spacing of projections 117 and 116 respectively of cover plate 101. These projections 116 and 117 are inserted into openings 164 and 163 respectively, and the ballast is then pivoted to bring mounting plate 101 flush with plate 150. A snap latch 246 (shown in FIG. 17) or, if desired, a screw, such as screw 169, secures projection 115 to plate 150. The projection 115 could be eliminated and replaced with a hole 500, as shown in FIG. 4, through the body of ballast 100. A suitable screw or fastener could secure the ballast to the mounting plate. When mounting plate 101 is mounted to cover plate 150, the connectors 170 and 171 are accessible through openings 160 and 161 for convenient connection of wires 147 and 148 to ballast 100.

It will be noted that, when ballast 100 is to be used in a fixture of the type of FIG. 11, the pivotal mounting plate side (plate 101) is used for ballast mounting. This enables simple mounting with a minimum of tools and the fixture wires are directly connectable to the ballast through the openings in plate 101.

Figure 16:
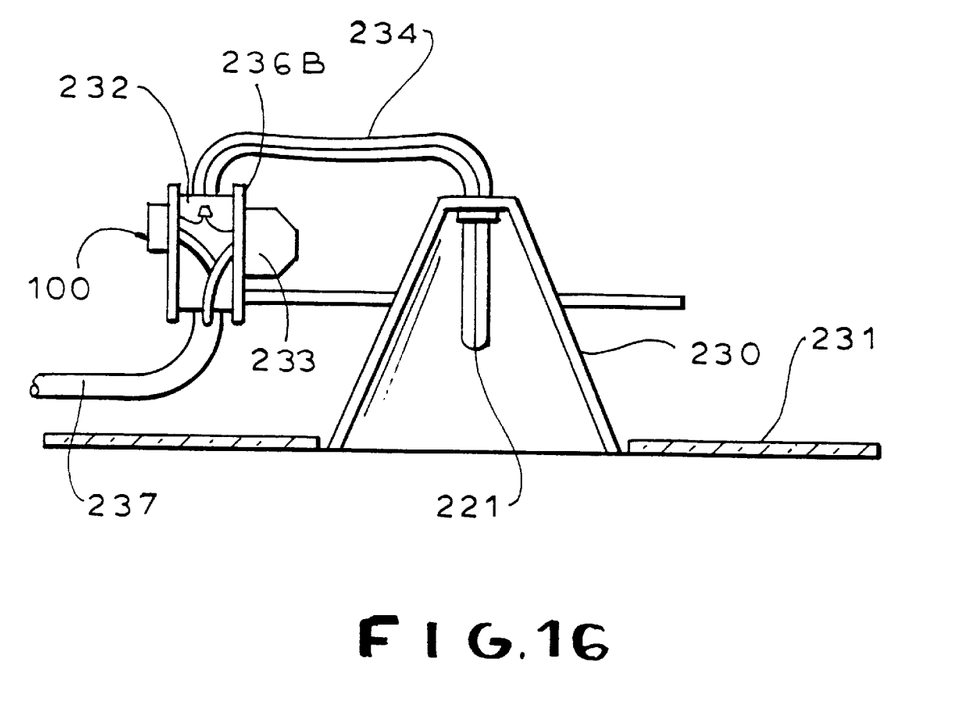
FIG. 16 is a schematic side view of another type of compact fluorescent down light fixture with the novel ballast connected thereto.

The same ballast 100 is also usable in the compact fluorescent "down-light" fixture, using a snap-in connection. Thus, a typical fluorescent down light fixture is shown in FIG. 16 which schematically shows a reflector 230 containing a fluorescent lamp 221 and mounted in a ceiling 231. A junction box 232, which is suitably supported (not shown), may have a standby emergency magnetic ballast 233 on one side mounted to junction box cover 236B, while the ballast 100 of the invention is mounted to junction box cover 236A. An input power line 237 enters the junction box and is connected through openings in cover plates 236A and 236B to the ballast interiors. Output wiring 234 then exits from junction box 232 to the lamp 221.

Figure 17:
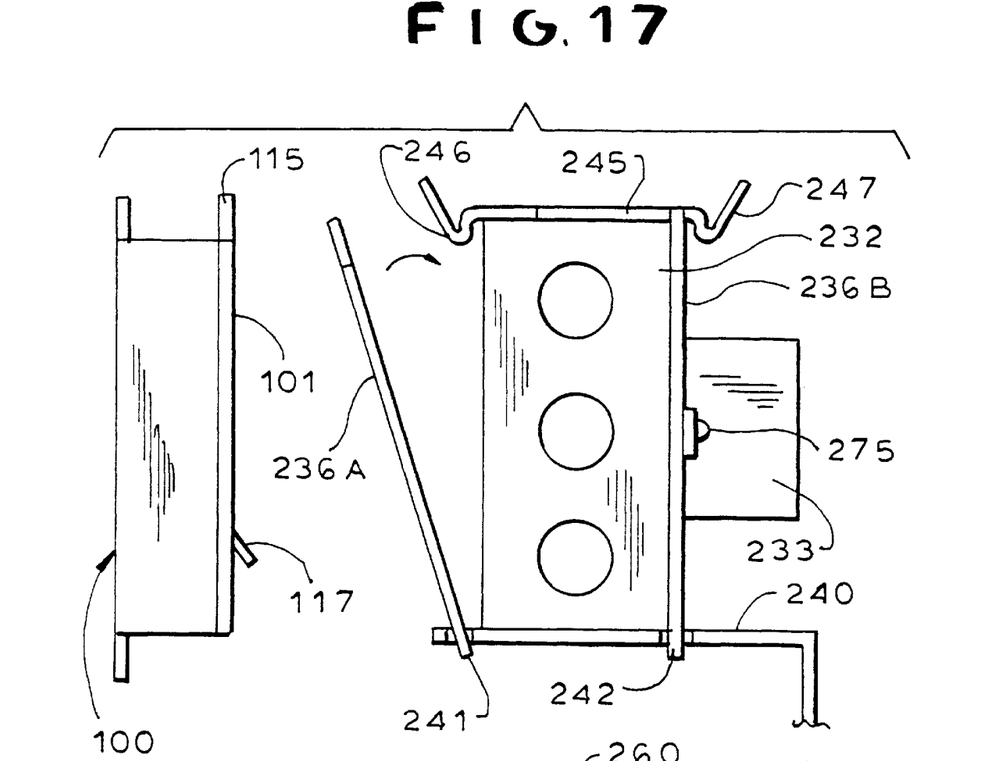
FIG. 17 is an exploded view of the ballast, mounting plate and junction box for the fixture of FIG. 16.
Figure 18:
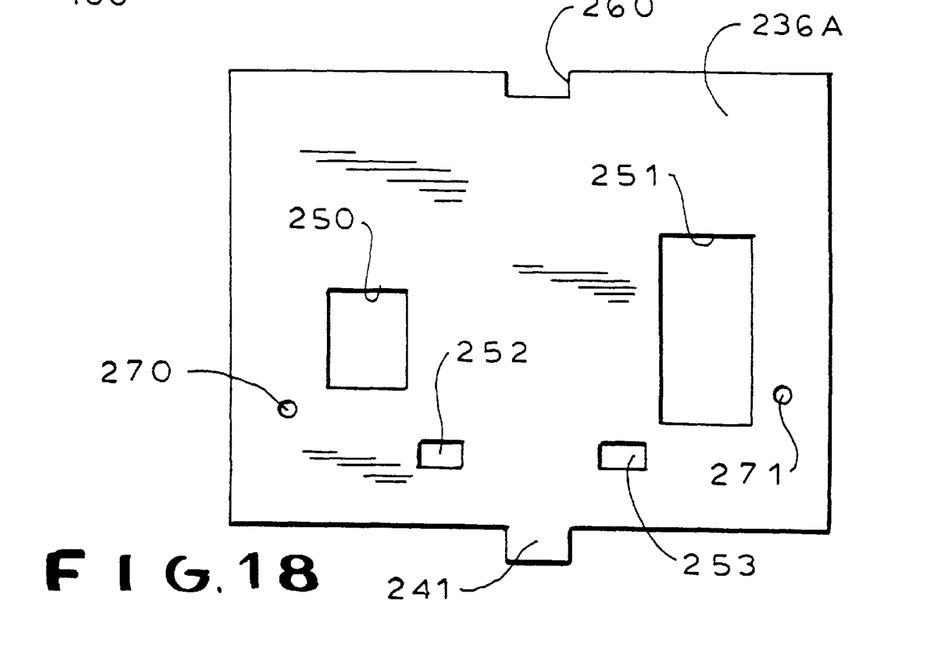
FIG. 18 is a plan view of the mounting plate of FIG. 17.
Figure 19:
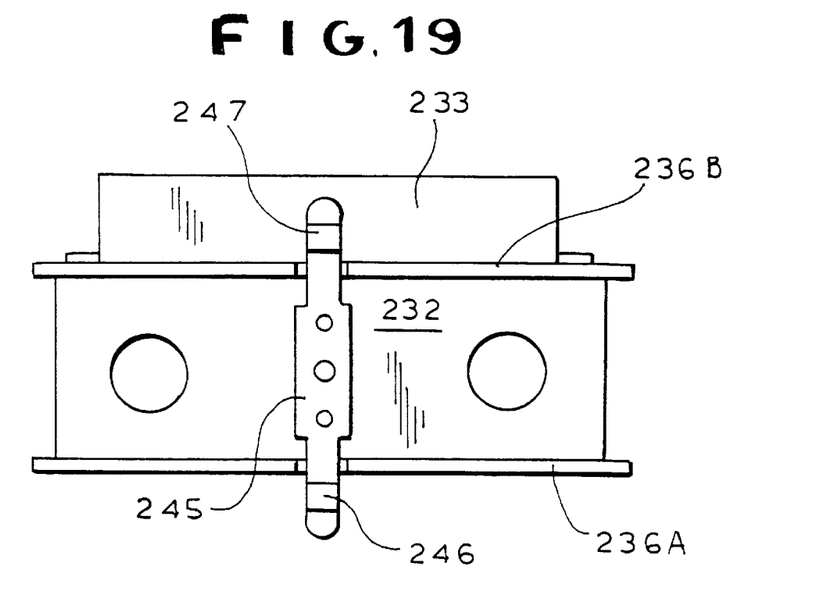
FIG. 19 is a top view of the assembly of FIG. 17.

FIGS. 17, 18 and 19 show the manner in which the novel ballast 100 can be mounted to cover 236A of FIG. 16. The covers 236A and 236B are adapted to be pivotally mounted to the junction box support frame 240 (as by extending tangs 241 and 242 respectively) of FIG. 17. The tops of covers 236A and 236B are fixed to the box 232 by spring connector 245 which has reentrantly shaped spring ends 246 and 247 (FIGS. 17 and 19) which can latch over the edges of plates 236A and 236B respectively.

The cover plate 236A is also provided with wire openings 250 and 251 (for permitting wiring access to ballast 100), and openings 252 and 253 arranged to pivotally receive projections 116 and 117 of mounting plate 101. Plate 236A also has a cutout 260 (FIG. 18) which can receive spring end 246. Thus, it is clear that ballast 100 can be easily mounted to plate 236A by inserting projections 116 and 117 into openings 252 and 253 and rotating the ballast until projection 115 snaps under spring latch 246.

Plate 236A also is provided with screw-receiving openings 270 and 271 (FIG. 18). These permit a ballast to be connected to cover 236A by mounting screws as shown in FIGS. 1 and 2. Thus, plate 236B may have the same structure as plate 236A and is shown in FIG. 17 as connected to ballast 233 by such mounting screws, including mounting screw 275 of FIG. 17.

Figure 20:
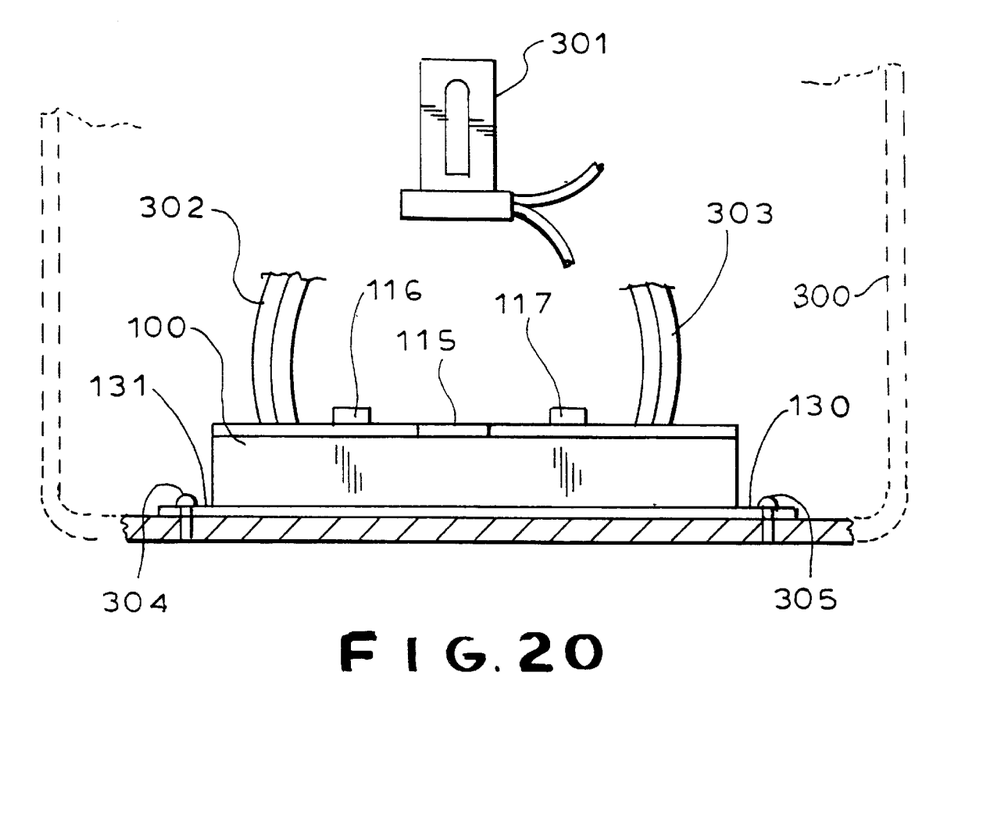
FIG. 20 is a schematic side view of still another type of compact fluorescent "high hat" fixture containing the novel universal ballast.

FIG. 20 shows a schematic section of a compact fluorescent "high-hat" fixture and shows the novel universality of the ballast 100. Thus, the fixture is basically a can 300 containing a lamp 301 with wiring only partly shown as input and output wires 302 and 303 to ballast 100. In an installation of this type, the ballast 100 is connected flush with the bottom surface of can 300 as by screws 304 and 305 in ears 130 and 131 respectively which are threaded into can 300. Wires 302 and 303 contact the interior circuits of ballast 100 through openings 103 and 104 in plate 101.

Figure 21:
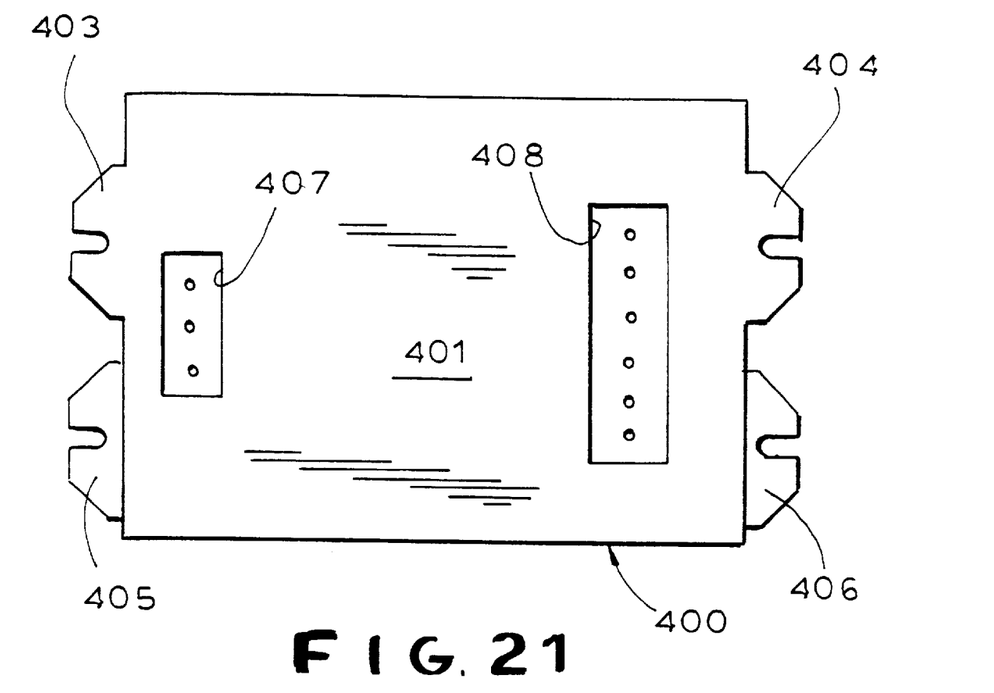
FIG. 21 is a top view of another embodiment of this invention in which offset screw tabs are provided in the opposing mounting surfaces of a ballast structure.
Figure 22:
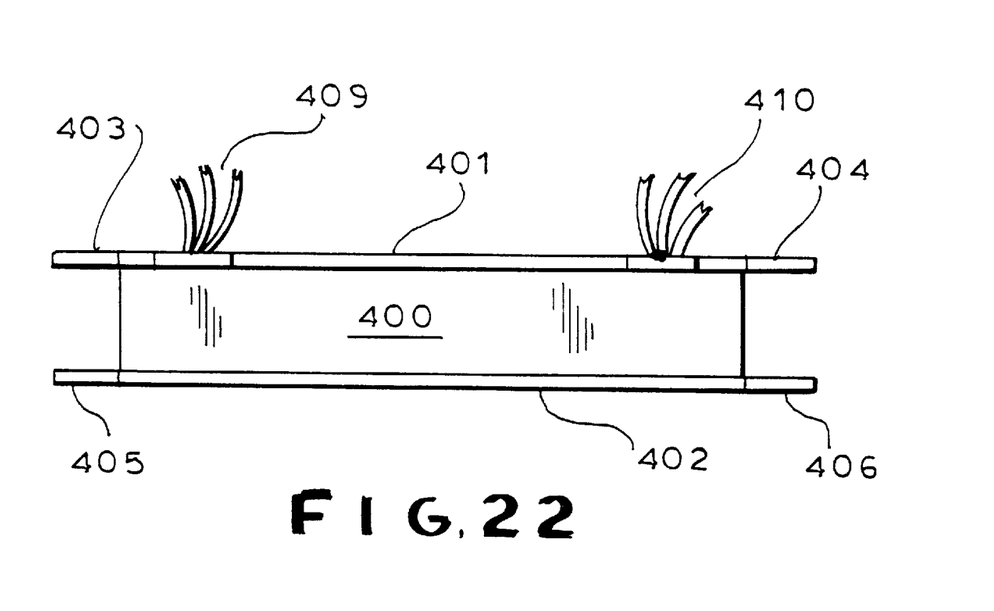
FIG. 22 is a side view of FIG. 21.

FIGS. 21 and 22 show a further embodiment of the invention in which a ballast 400 is provided with two mounting plates 401 and 402 on its opposite surfaces which may have an identical structure, both having screw mounting ears 403–404 and 405–406 respectively. Plate 401 has openings 407 and 408 which expose respective connectors, while plate 402 may be solid throughout. Wires 409 and 410 (FIG. 22) extend through openings 407 and 408 respectively in mounting plate 401.

The sets of mounting ears 403–404 and 405–406 lie along respective lines which are parallel to one another but are laterally spaced apart so that one set will not interfere with or prevent easy access to the other set during installation.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A fluorescent lamp ballast which is capable of being pivotally connected to a surface of a fluorescent lamp fixture; said ballast having a generally rectangular parallelepiped shape and having first and second mounting plates on opposite surfaces of said parallelepiped shape; the first mounting plate having tool-free snap-in connector means adapted to make snap-in connection into a cooperating snap receiving means formed on a fixture adapted to mount a ballast by snap-in connection; and at least one wire passage opening in a selected one of said first and said second mounting plates to permit connection of fixture wire to said ballast;

said tool-free snap-in connector means comprising pair of spaced prongs at one side of said first mounting plate which are integral with said first mounting plate which project laterally out of a plane defined by said first mounting plate and are insertable into respective prong receiving slots in a junction box of a fixture, and a latch projection at an opposite side of said of said first mounting plate which is releasably connectable to a cooperating snap latch projection extending from said junction box of said fixture;

said latch projection having an opening there through to receive a connector for fastening said ballast to said junction box.

2. A fluorescent lamp ballast which is capable of being either ear mounted to a first type of fluorescent lamp fixture or pivotally connected to a surface of a second type of fluorescent lamp fixture; said ballast structure having a generally rectangular parallelepiped shape and having first and second mounting plates on opposite sides of said parallelepiped shape; said first mounting plate having bolt receiving mounting and connection ears for bolting said ballast structure to cooperating bolt receiving means in a fixture adapted to mount a ballast by a bolt connection; said second mounting plate having tool-free snap-in connector means adapted to make snap-in connection into a cooperating snap receiving means formed on a fixture adapted to mount a ballast by snap-in connection; and at least one wire passage opening in a selected one of the first or the second mounting plate to permit connection of fixture wires to said ballast.

3. The ballast as claimed in claim 2, wherein said first type of fixture or said second type of fixture has a junction box, and wherein said second mounting plate is secured to a surface of said junction box.

4. The ballast of claim 2 wherein said ballast is a ballast selected from the group consisting of magnetic and electronic ballasts.

5. The ballast of claim 2 wherein said first and second mounting plates each consist of thin metal stampings.

6. The ballast of claim 2 wherein said bolt receiving mounting and connection ears comprise first and second slotted mounting tabs disposed at and extending from respective ones of two opposite edges of said first mounting plate.

7. The ballast of claim 2, further wherein said first type of fixture or said second type of fixture has a junction box, and wherein said tool-free snap-in connector means comprises a pair of spaced prongs at one side of said second mounting plate which are integral with said second mounting plate and which project laterally out of a plane defined by said second mounting plate and are insertable into respective prong receiving slots in said junction box of said fixture, and a latch projection at an opposite side of said second mounting plate which is releasably connectable to a cooperating snap latch projection extending from said junction box.

8. The ballast of claim 7 wherein said latch projection has an opening therethrough to receive a connector for fastening said ballast structure to said junction box.

9. A fluorescent lamp ballast having a universal mounting structure; said universal mounting structure enabling the mounting of said ballast to a variety of different fluorescent lamp fixtures which have wiring for connection to fluorescent lamps which are disposed within their said respective fixtures; said fluorescent lamp ballast having a generally rectangular parallelepiped shape and having first and second mounting plates on opposite surfaces of said parallelepiped shape; said first mounting plate having a first pair of bolt receiving mounting means at opposite edges for bolting said ballast to cooperating bolt receiving means in a fixture, said first pair of bolt receiving mounting means being coplanar with said first mounting plate; said second mounting plate having a second pair of bolt receiving means at opposite edges for bolting said ballast to cooperating bolt receiving means in a fixture, said second pair of bolt receiving means being coplanar with said second mounting plate; and at least one wire passage opening in one of said first and second mounting plates to permit connection of fixture wires to said ballast.

10. The ballast of claim 9 wherein said ballast is a ballast selected from the group consisting of magnetic and electronic ballasts.

11. The ballast of claim 9 wherein said first and second mounting plates each consist of thin metal stampings.

12. In combination, a fluorescent lamp fixture having a junction box and a lamp ballast for said fixture; said junction box having a mounting cover plate removably connected thereto by a snap connection structure to permit access to lamp wiring within said junction box; said mounting cover plate having at least one opening therein to permit selected connection wires to extend between said lamp ballast and said junction box; said lamp ballast having a mounting plate secured thereto to enable its snap-in connection to said mounting cover plate of said junction box; said lamp ballast mounting plate having at least one projection tab and at least one hinge projection; said mounting cover plate having at least one opening for receiving said at least one hinge projection, wherein when said hinge projection is disposed in said at least one opening, said at least one projection tab is releasably engageable by the same snap connection structure which connects said mounting cover plate to said junction box; said mounting plate of said lamp ballast having at least one opening therein in registry with said opening in said mounting cover plate when said mounting plate of said lamp ballast is mounted in snap-connection to said mounting cover plate.

13. A ballast mounting plate which is connectable to a lamp ballast for mounting said lamp ballast to a junction box of a lamp fixture; said mounting plate having at least one wire passage opening, a plurality of spaced mounting projections which are integral therewith and are mounted adjacent one edge of said plate, and a latch extension projection which is generally coplanar with said mounting plate and integral therewith and is disposed adjacent an opposite edge to said one edge of said plate and extending outwardly and away from said plate; said plate being connectable in snap-in relation to a fluorescent lamp fixture.

14. The ballast mounting plate of claim 13, wherein said mounting plate is secured to a surface of said junction box.

15. The ballast mounting plate of claim 13 wherein said lamp ballast is a ballast selected from the group consisting of magnetic and electronic ballasts.

16. A fluorescent lamp ballast which is capable of being removably connected to a surface of a fluorescent lamp fixture; said ballast structure having a generally rectangular parallelepiped shape and having first and second generally flat mounting plates on opposite surfaces of said parallelepiped shape; said first mounting plate having pivotal connection means to make removable connection to a fixture; and a fastener means opening extending through said first mounting plate at a position spaced from said pivotal connection means for receiving a fastener to connect said first mounting plate to a fixture surface; and at least one wire passage opening in a selected one of said first and said second mounting plates to permit connection of fixture wire to said ballast.

17. The ballast of claim 16, wherein said fixture has a junction box, and wherein said first mounting plate is secured to a surface of said junction box.

18. The ballast of claim 16 wherein said first and second mounting plates each consist of thin metal stampings.

\* \* \* \* \*